US008866826B2

(12) United States Patent
Reid et al.

(10) Patent No.: US 8,866,826 B2
(45) Date of Patent: Oct. 21, 2014

(54) METHOD AND APPARATUS FOR DISPATCHING GRAPHICS OPERATIONS TO MULTIPLE PROCESSING RESOURCES

(75) Inventors: Gregory A. Reid, Raleigh, NC (US); Hanyu Cui, Raleigh, NC (US); Praveen V. Arkeri, Bangalore (IN); Ashish Bijlani, Raleigh, NC (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 904 days.

(21) Appl. No.: 13/025,006

(22) Filed: Feb. 10, 2011

(65) Prior Publication Data

US 2012/0206463 A1    Aug. 16, 2012

(51) Int. Cl.
| | |
|---|---|
| *G06F 15/80* | (2006.01) |
| *G06F 13/14* | (2006.01) |
| *G06F 15/16* | (2006.01) |
| *G06T 1/20* | (2006.01) |
| *G06F 13/372* | (2006.01) |
| *G06F 13/00* | (2006.01) |
| *G06F 12/14* | (2006.01) |
| *G06F 13/24* | (2006.01) |
| *G06F 9/46* | (2006.01) |
| *G06F 9/50* | (2006.01) |

(52) U.S. Cl.
CPC .............. *G06F 9/5027* (2013.01); *G06F 9/505* (2013.01)
USPC ........... 345/505; 345/502; 345/522; 345/503; 345/504; 345/534; 345/536; 710/200; 710/267; 710/263; 711/168; 712/244; 718/102; 718/107; 718/105

(58) Field of Classification Search
CPC ... G06F 9/3877; G06F 9/3885; G06F 9/4881; G06F 9/3009; G06F 12/0842; G06T 2210/52; G06T 1/60
USPC .......... 710/200, 267, 263; 711/168; 712/244; 718/102, 107, 105; 345/505, 502, 522, 345/503, 504, 534, 556
See application file for complete search history.

(56) References Cited

U.S. PATENT DOCUMENTS

| | | | |
|---|---|---|---|
| 6,785,799 B1 * | 8/2004 | Yamasaki et al. ............... 712/20 |
| 7,236,165 B2 * | 6/2007 | Dautelle ....................... 345/418 |
| 2006/0248275 A1 * | 11/2006 | Blackmon et al. ............ 711/125 |
| 2007/0067606 A1 * | 3/2007 | Lin et al. ......................... 712/10 |
| 2008/0133897 A1 * | 6/2008 | Reid et al. ..................... 712/227 |
| 2008/0320487 A1 * | 12/2008 | Fontenot et al. .............. 718/105 |
| 2010/0185833 A1 * | 7/2010 | Saito et al. .................... 712/203 |
| 2011/0047362 A1 * | 2/2011 | Eichenberger et al. ....... 712/226 |
| 2011/0213998 A1 * | 9/2011 | Mathieson et al. ........... 713/324 |
| 2012/0137012 A1 * | 5/2012 | Stewart et al. ................ 709/230 |
| 2012/0198458 A1 * | 8/2012 | Hartog et al. ................. 718/102 |
| 2013/0132708 A1 * | 5/2013 | Kurihara et al. ............... 712/42 |

OTHER PUBLICATIONS

HPC Wire, "Heterogeneous Processing Needs Software Revolutions," by the High-End Crusader, Jun. 23, 2006, retrieved from http://www.hpcwire.com/features/17885489.

* cited by examiner

*Primary Examiner* — Jeffrey Chow
(74) *Attorney, Agent, or Firm* — Neugeboren O'Dowd PC

(57) ABSTRACT

Parallel graphics-processing methods and mobile computing apparatus with parallel graphics-processing capabilities are disclosed. One exemplary embodiment of a mobile computing apparatus includes physical memory, at least two distinct graphics-processing devices, and a bus coupled to the physical memory and the at least two graphics-processing devices. A virtual graphics processing component enables each of at least two graphics-processing operations to be executed, in parallel, by a corresponding one of the at least two distinct graphics-processing devices, which operate in the same memory surface at the same time.

39 Claims, 4 Drawing Sheets

METHOD AND APPARATUS FOR DISPATCHING GRAPHICS OPERATIONS TO MULTIPLE PROCESSING RESOURCES

FIELD OF THE INVENTION

The present invention relates to computing devices. In particular, but not by way of limitation, the present invention relates to apparatus and methods for graphics-processing management in computing devices.

BACKGROUND OF THE INVENTION

Mobile computing devices (e.g., smart phones, PDAs, desktop and mobile computers, and mobile media devices) are now capable of processing and displaying impressive graphics including gaming graphics and videos. But there are several performance limitations to the methods that are used in connection with both existing and anticipated graphics processing architectures. As a consequence, the presentation of graphical content is often discontinuous, delayed or otherwise unsatisfactory.

Moreover, future graphics needs are expected to continue to grow exponentially. For example, main stream consumer demand is expected to grow for stereoscopic 3D displays, HDTV (e.g., 1080 p resolution), higher and higher frame rates, and computing devices that utilize both internal and external displays (e.g., that each display different content). Accordingly, current systems do not always operate in a desirable manner and will most certainly not be satisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One aspect of the invention may be characterized as a method for managing graphics processing of a computing device. This method may include receiving a plurality of requests for graphics-related operations that include a prior request for a first graphics-related operation and a subsequent request for a second graphics-related operation. In addition, a time-ordered list of the plurality of requests for graphics-related operations is created that includes the prior request and the subsequent request. Execution of the first graphics-related operation with a first graphics-processing resource is initiated and potential-memory-utilization-information is received that provides an indication of potential memory usage by a second graphics-processing resource if the second graphics-related operation were executed by the second graphics-processing resource. And the second graphics-related operation is executed with the second graphics-processing resource simultaneously with the execution of first graphics-related operation by the first graphics-processing resource if the potential-memory-utilization-information indicates that the second graphics-related operation may be executed by the second graphics-processing resource without conflicting with the execution of the first graphics-related operation.

Another embodiment may be characterized as a mobile computing apparatus that includes physical memory, at least two distinct graphics-processing devices, a bus coupled to the physical memory and the at least two graphics-processing devices, and a virtual graphics processing component that is adapted to enable each of at least two graphics-processing operations to be executed, in parallel, by a corresponding one of the at least two distinct graphics-processing devices, which operate in the same memory surface at the same time.

Yet another embodiment may be characterized as a non-transitory, tangible computer readable storage medium, encoded with processor readable instructions to perform a method for managing graphics processing of a computing device. This method may include receiving a plurality of requests for graphics-related operations that include a prior request for a first graphics-related operation and a subsequent request for a second graphics-related operation. In addition, a time-ordered list of the plurality of requests for graphics-related operations is created that includes the prior request and the subsequent request. Execution of the first graphics-related operation with a first graphics-processing resource is initiated and potential-memory-utilization-information is received that provides an indication of potential memory usage by a second graphics-processing resource if the second graphics-related operation were executed by the second graphics-processing resource. And the second graphics-related operation is executed with the second graphics-processing resource simultaneously with the execution of first graphics-related operation by the first graphics-processing resource if the potential-memory-utilization-information indicates that the second graphics-related operation may be executed by the second graphics-processing resource without conflicting with the execution of the first graphics-related operation.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
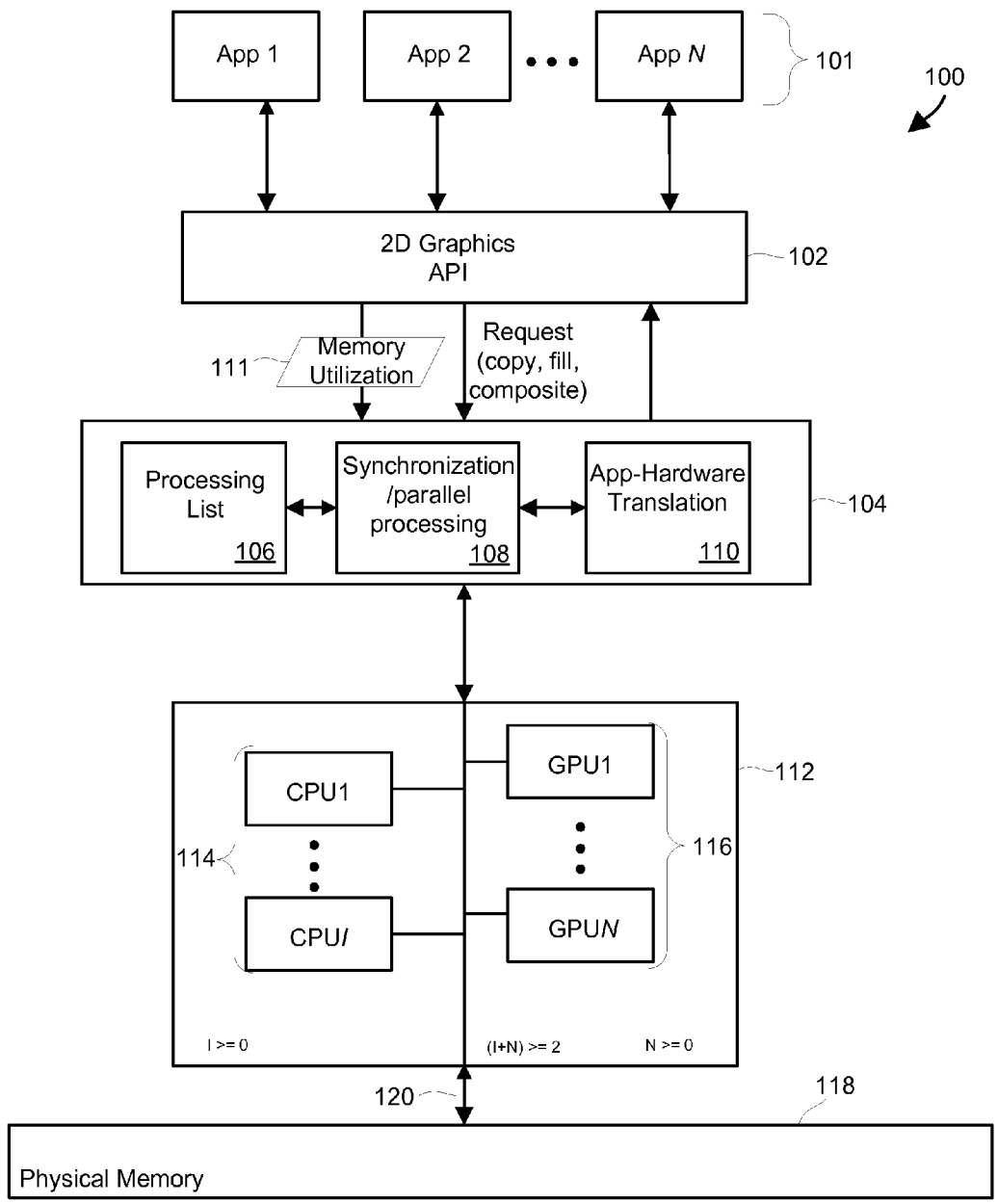
FIG. 1 is a block diagram depicting, in the context of abstraction layers from software to hardware, an exemplary computing device of the present invention.

In general, several embodiments of the present invention provide, among other things, parallel processing of graphics-related operations over two or more graphics-processing resources. Referring first to FIG. 1 for example, shown is a block diagram depicting components of an exemplary mobile device 100 in connection with system layers in which the components may be implemented. As depicted, applications 101 are shown in communication with a 2D graphics API 102 that is in communication with a virtual graphics processor 104, which includes a processing list 106, synchronization component 108, and a translation component 110. In addition, memory utilization information 111 is shown communicating between the 2D graphics API 102 and the virtual graphics processor 104. As shown, the virtual graphics processor 104 is also in communication with graphics-processing resources 112 including I CPUs 114 and N graphics processing units (GPUs) 116, where I+N is greater-than or equal to two. And the graphics-processing resources 112 are coupled to physical memory 118 via bus 120.

It should be recognized that FIG. 1 is a simplified and logical depiction of components of the mobile device 100 and is not meant to be an actual hardware diagram. One of ordinary skill in the art will readily appreciate that the depicted components may be realized by a combination of hardware and software, and can be combined, or further separated and sub-divided, in an actual implementation. In addition, the components can be connected in a variety of ways without changing the basic operation of the system. Moreover, components may be removed and/or supplemented so that more or less components can be utilized in any particular implementation.

The applications 101 may be realized by a variety of applications that utilize the graphics-processing resources 112. For example, the applications 101 may include a web browser and associated plug-ins, entertainment applications (e.g., video games, video players), productivity applications (e.g., word processing, spread sheet, publishing applications, video editing, photo editing applications), and augmented reality applications.

The I CPUs 114 may be realized by a variety of CPU types that are capable of carrying out graphics-related operations including, for example, 8650a CPUs that include Neon single instruction multiple data (SIMD) instructions sets; 8860 CPUs, 8672 CPUs, future multi-core CPUs, and other yet to be developed CPUs. And each of the I CPUs 114 may be either separately realized or integrated as one of many cores in a multi-core processor.

The N GPUs 116 (also referred to herein as backend hardware) are generally graphics-processing resources that are capable of carrying out graphics-related operations (e.g., to offload operations from the I CPUs 114). Each of the N GPUs 116 may be realized by a variety of processing devices that are capable of effectuating graphics-related processing requests including, for example, z180 cores and MDP processors.

The 2D graphics API 102 generally operates to provide to provide a common interface (e.g., common function calls) for the applications 101 to request graphics-related operations and communicate the requests in a translated form to the virtual graphics processor 104. The requests may include, for example, requests to copy, fill, and composite graphical content. For exemplary purposes, the 2D graphics API 102 is described in many implementations as an Xorg API (e.g., X11 API), but alternative embodiments are realized by Skia, C2D, OpenVG, or other APIs.

The virtual graphics processor 104 in this embodiment generally provides a single, virtual graphics processing resource for two or more of the graphics-processing resources 112 and operates to select, based upon the type of graphics-related operations that are requested, two or more particular ones of the graphics-processing resources 112 to simultaneously carry out the requested graphics-related operations, and then, using the translation component 110, communicate translated requests to the graphics-processing resources 112 to effectuate the simultaneous processing.

Beneficially, many implementations of the synchronization component 108 are capable of coordinating and directing which particular ones of the graphics-processing resources 112 carry out particular types of graphics-processing operations; thus the synchronization component 108 is able to direct each graphics-processing resource to execute operations that are best suited to the resource. In other words, overall performance is enhanced over prior graphics-processing approaches because the synchronization component 108 is capable, as a single, virtual backend, of directing operations to the resources that are best suited to carry out the operations.

Although not required, the virtual graphics processor 104 may be realized by an X11 driver that is modified to include the processing list 106 and synchronization component 108. And in many implementations, the translation component 110 translates the requests for graphics operations into driver-specific requests that are specific to drivers (e.g., kernel-level device drivers) that communicate with corresponding ones of the graphics-processing resources 112.

In general, the synchronization component 108 of the virtual graphics processor 104 analyzes a queue of requests for graphics-related operations that is maintained in the processing list 106, and based upon the queue of requests, determines whether two or more requests may be carried out in parallel by two or more graphics-processing resources 112.

In connection with each of the requests queued in the processing list 106, memory-utilization information is obtained so that the synchronization component 108 may determine whether a particular one of the graphics-processing resources 112 may be invoked to process a graphics related operation in parallel with another one of the graphics-processing resources 112 without creating a memory-utilization conflict.

In the embodiment depicted in FIG. 1, the 2D graphics API 102 provides memory-utilization information 111 to the virtual graphics processor 104. For example, the memory-utilization information 111 may include the starting location, size, and the right, top, and bottom boundaries of a memory region that is utilized by one of the graphics-processing resources 112 to carry out a graphics operation. This memory-utilization information 111 enables the synchronization component 108 to determine whether a subsequent graphics-processing operation (e.g., an operation that is desirable to be carried out by one of the I CPUs) might intersect (if effectuated simultaneously) with the coordinates of an operation that is already queued to another one of the graphics-processing resources 112 (e.g., one of the N GPUs 116).

As a consequence, to parallelize operations, the synchronization component 108 need only determine whether a new operation conflicts with a queued operation, and if so, how long it would have to wait for that operation to complete.

In the context of a mobile device that utilizes an X11 API to realize the 2D graphics API 102, potential memory utilization for a yet-to-be completed graphics-related operation may be obtained using PrepareAccess( ) and FinishAccess( ) callback functions as discussed further herein.

Figure 2:
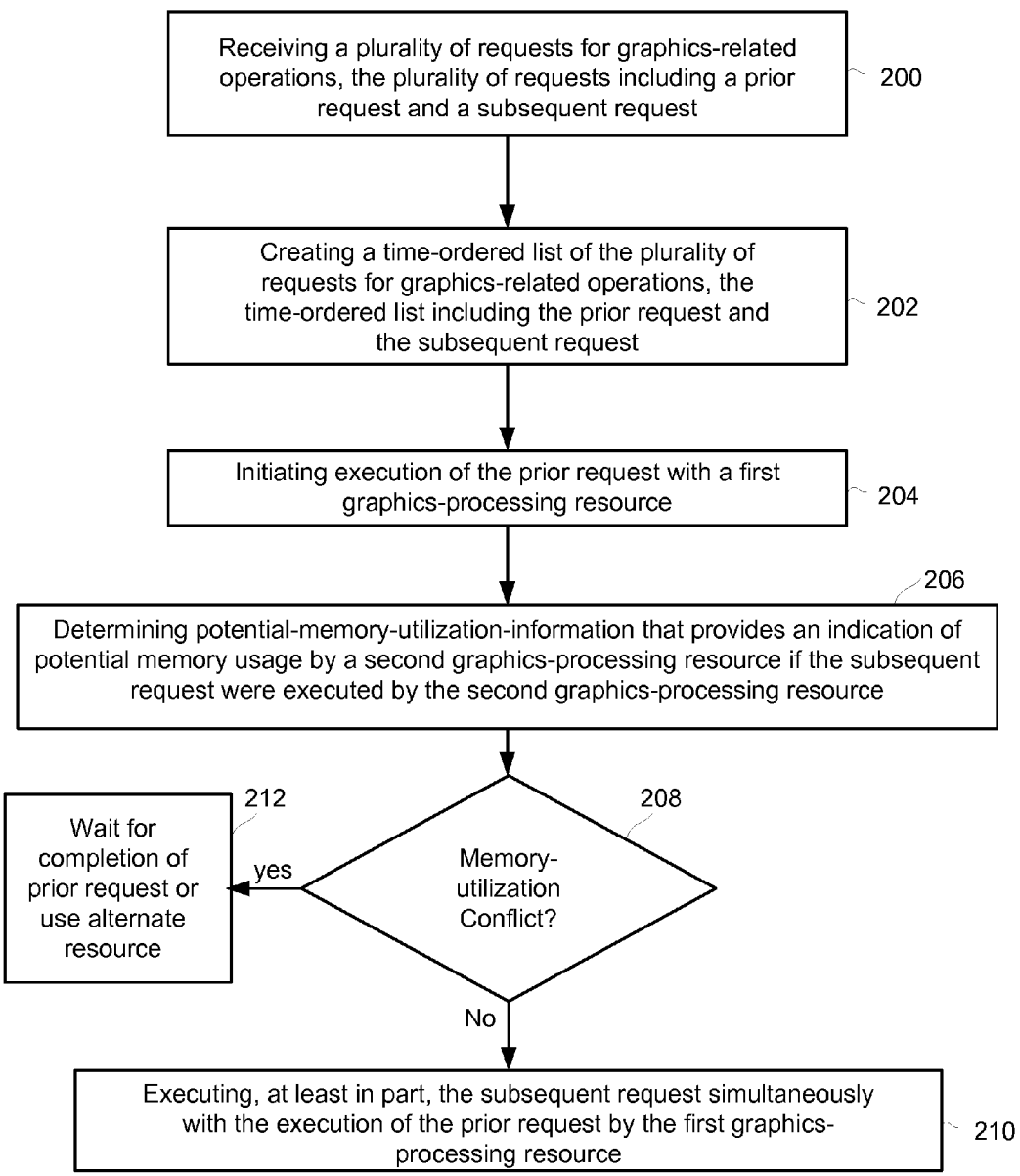
FIG. 2 is a flowchart depicting steps that may be traversed in connection with several embodiments of the present invention.

Referring next to FIG. 2, shown is a flowchart depicting steps that may be traversed in connection with the embodiments depicted in FIG. 1. As shown, initially requests are received (e.g., at the virtual graphics processor 104) for graphics-related operations, which include a prior request for a first graphics-related operation and a subsequent request for a second graphics-related operation (Block 200). The requests, as discussed above, may originate from one or more of the N applications 101, and the requests are translated from the 2d graphics API 102 from generic requests to specific requests for graphics-related operations. For example, the requested operations may include copy, fill, and compositing requests.

As depicted, a time-ordered list of the plurality of requests for graphics-related operations is created that includes the prior request and the subsequent request (Block 202). In the embodiment depicted in FIG. 1, the synchronization component 108 creates the time-ordered list, which is stored in the processing list 106.

In response to the received requests, execution of the prior request for a first graphics-related operation is initiated with a first graphics-processing resource (Block 204). Assuming the prior request is a request for a copy operation for example, the synchronization component 108 may initiate execution of the copy operation by routing the request for the copy operation to a kernel-level driver for one of the N GPUs 116. In many embodiments, before initiating execution of requested operations, the synchronization component 108 determines, based upon the types of graphics-processing resources 112 that are available, which one of graphics-processing resources 112 should handle the requested graphics processing operation. And in some embodiments discussed further herein, the determination as to which one of graphics-processing resources 112 should handle the request is based upon the graphics-processing resource that is capable of most closely approaching an optimal performance characteristic such as speed or power.

As shown in FIG. 2, potential-memory-utilization-information, which provides an indication of potential memory usage by a second graphics-processing resource (if the second graphics-related operation were executed by the second graphics-processing resource) is also determined (Block 206), and if there is not a memory-utilization conflict (Block 208), the second graphics-related operation is executed, at least in part, by the second graphics-processing resource simultaneously with the execution of the first graphics-related operation by the first graphics-processing resource (Block 210). But if there is a memory-utilization conflict (Block 208), either an alternate graphics-processing resource is utilized to execute the second graphics-related operation or the first graphics-related operation is completed before the second graphics-related operation is executed (Block 212).

In the embodiment in FIG. 1, the 2D Graphics API 102 is utilized to determine the potential-memory-utilization-information. For example, as discussed further herein, in the context of a mobile device that utilizes an X11 API to realize the 2D graphics API 102, potential memory utilization for a yet-to-be completed graphics-related operation may be obtained using PrepareAccess( ) and FinishAccess( ) callback functions.

Although prior approaches to carrying out graphics-related operations on a mobile device are known to utilize more than one graphics-processing resource, in accordance with these prior approaches, the graphics-processing resources operate sequentially so that a first graphics-processing resource completes its execution of an operation before a second graphics-processing resource begins executing an operation. For example, consistent with existing approaches (e.g., existing X11 drivers), when a request is received that is best handled (e.g., more expeditiously handled) by an MDP resource, the request is queued to an MDP kernel driver for execution, but when a subsequent request that is best handled by a Neon backend is received, the driver waits for all MDP requests to complete and then executes the Neon instruction.

Figure 3A:
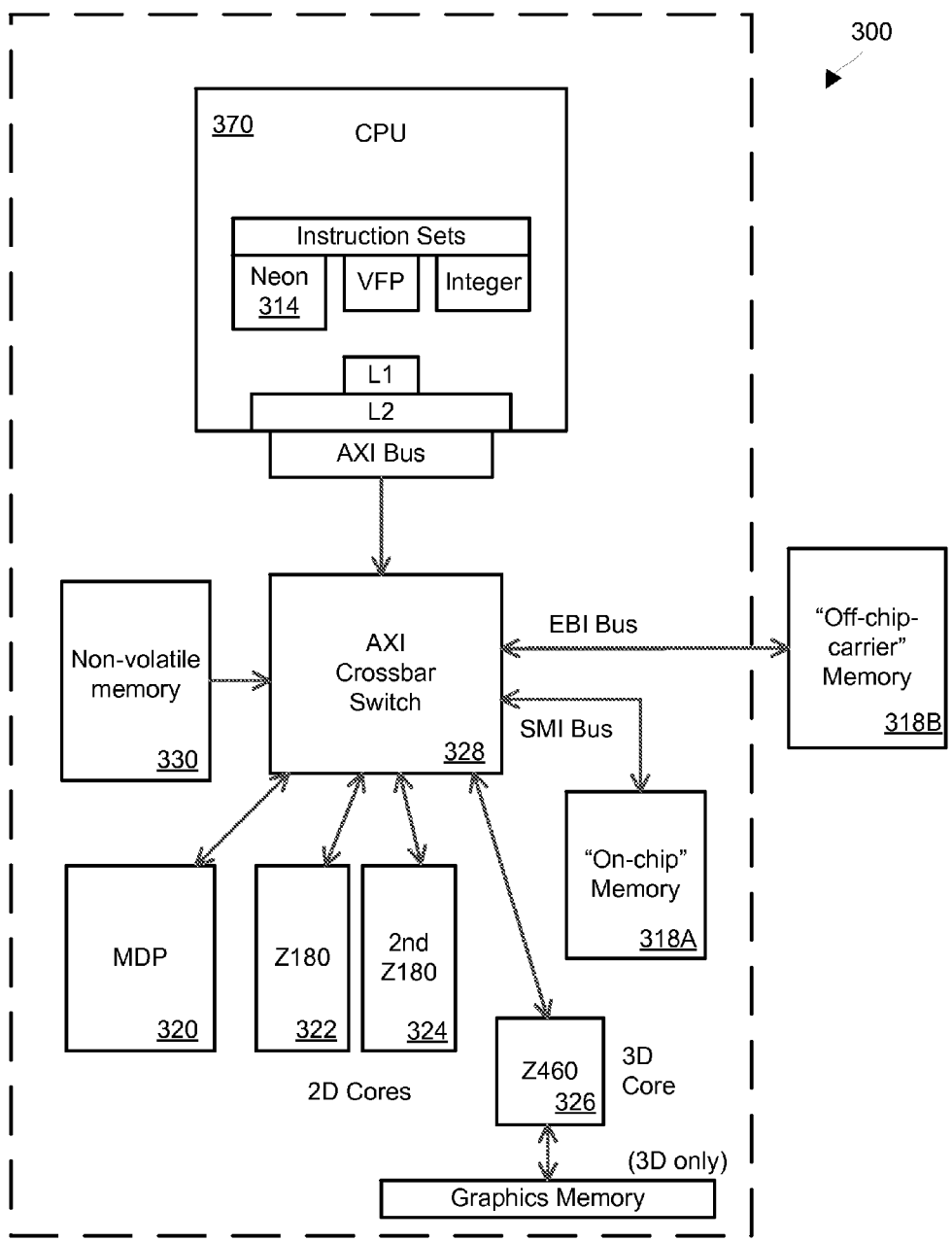
FIG. 3A is a block diagram depicting hardware components that may be used in connection with embodiments of the present invention.
Figure 3B:
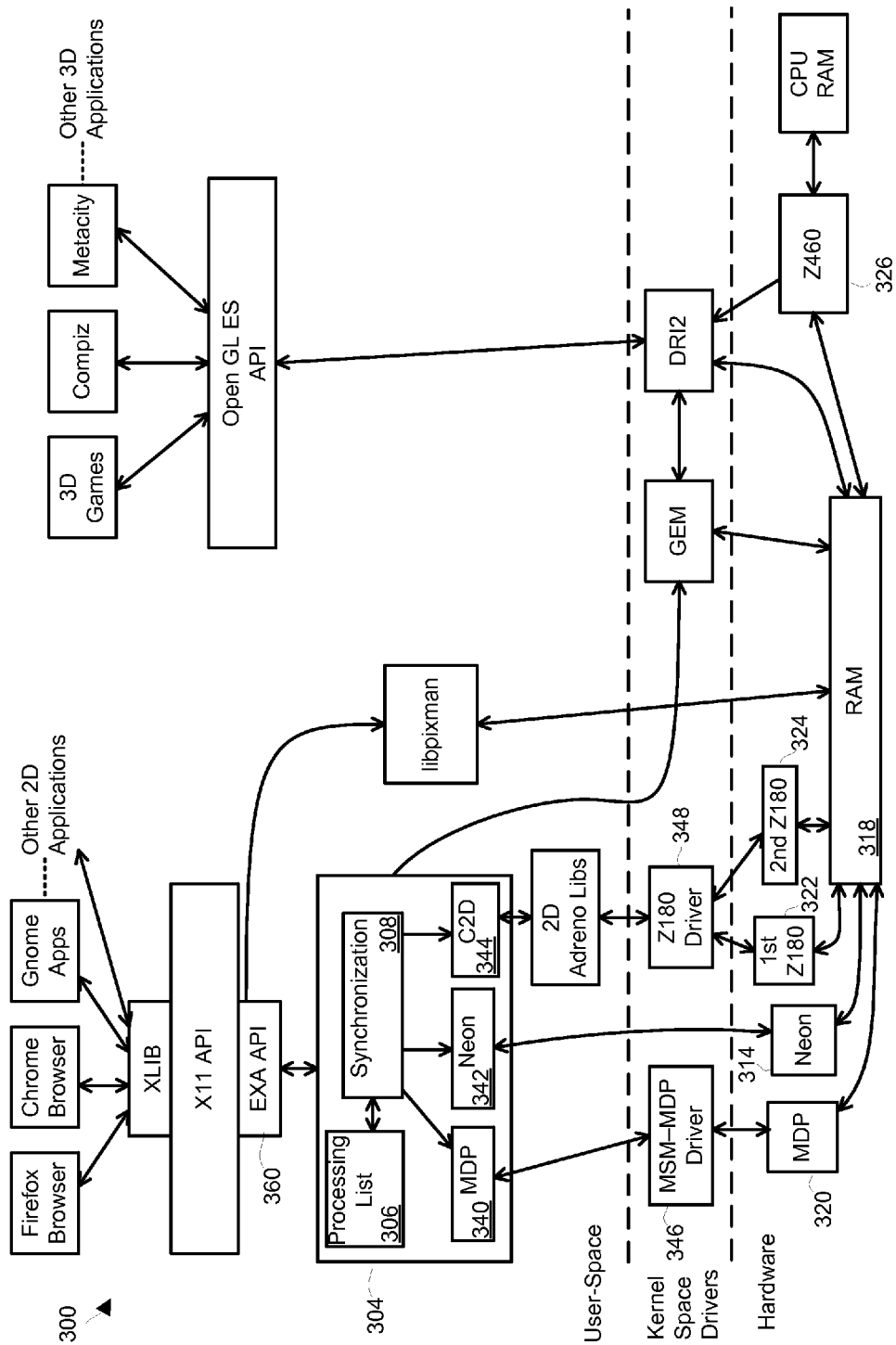
FIG. 3B is a block diagram depicting, in the context of abstraction layers from software to hardware, another exemplary computing device of the present invention.

Referring next to FIGS. 3A and 3B, shown are block diagrams depicting system hardware architecture and system dataflow, respectively, for an exemplary mobile device 300. As shown in FIG. 3A, in this embodiment the available graphics-processing resources include a Neon resource 314 (e.g., a CPU that includes Neon single instruction multiple data (SIMD)), an MDP resource 320, a first z180 resource 322, a second z180 resource 324, and a Z460 resource 326, which are shown coupled to an AXI crossbar switch 328. In addition, on-chip memory 318A, off-chip memory 318B, and nonvolatile memory 330 are shown coupled to the AXI crossbar switch 328.

For clarity, many components (e.g., display and user interface components) are not depicted in FIGS. 3A and 3B. In addition, the mobile device 300 may also include components (e.g., transceiver chains) associated with receiving and transmitting content wirelessly.

As shown in FIG. 3B, a virtual graphics processor 304 is implemented by a modified Xorg driver that is adapted and disposed to enable parallel processing of graphics-related operations by the MDP resource 320, the first z180 resource 322, the second z180 resource 324 and the Neon resource 314. More specifically, the synchronization component 308 in connection with the processing list 306, coordinates parallel processing of graphics-related operations using at least two of the Neon resource 314, MDP resource 320, the first z180 resource 322, and the second z180 resource 324.

As one of ordinary skill in the art will appreciate, the user-space and kernel-space components depicted in FIG. 3B may be realized by code stored in the nonvolatile memory 330 that is executed by the CPU 370. Although it is possible to execute the code from the nonvolatile memory 330 in many variations of the depicted embodiment, the executable code in the nonvolatile memory 330 is typically loaded into physical memory 318 and executed by one or more processing devices (e.g., the CPU 370).

Although several implementations of the synchronization component 308 coordinate simultaneous parallel execution among potentially all of the graphics-processing resources (the MDP resource 320, the first z180 resource 322, the second z180 resource 324 and the Neon resource 314), in alternative implementations, the synchronization component 308 is adapted to coordinate simultaneous and parallel processing of graphics-processing operations on only two graphics-processing resources. In some implementations for example, the synchronization component 308 coordinates parallel processing of the Neon resource 314 and the MDP resource 320, which provides substantial benefits over known processing techniques. In other implementations, the synchronization component 308 is adapted to coordinate parallel processing of the Neon resource 314 and one of the first z180 resource 322 or the second z180 resource 324. And in yet other implementations, the synchronization component 308 is adapted to coordinate parallel processing among the Neon resource 314 and one or more other Neon resources (not shown) in addition to the MDP resource 320, the first z180 resource 322, and the second z180 resource 324.

As shown, the virtual graphics processor 304 in this embodiment includes an MDP driver component 340, a Neon driver component 342, and a z180 driver component 344, which are adapted to communicate with an MDP kernel driver 346, the Neon resource 314, and the z180 kernel-level driver 348, respectively.

Prior techniques have utilized a mixed, but not parallel, combination of graphics-processing resources to improved performance (because even without parallel processing, disparate graphics-processing resources tend to complement each other). For example, it is known that the Neon resource 314 processes a solid fill type of processing operation very quickly while the MDP resource 320 does not provide fill acceleration at all, so these two backends are often combined into a virtual backend referred to herein as a mixed Neon-MDP virtual backend, which includes high-speed solid fill support.

But there are several shortcomings to the prior, mixed use of graphics-processing resources:

Because of the need to synchronize the graphics pipeline each time a Neon request or a fallback operation is requested, latency is added to graphics processing. Tests have shown that the CPU wait time is often as high as 30% of the CPU. This wait time is often the largest delay in the graphics stack. If the hardware graphics backend is 100% busy (and this is fairly common), this can typically add 30% to benchmark times.

It is architecturally impossible to share more than two graphics-processing resources, which will be especially important on future systems (e.g., future multi-core CPU systems) where more graphics-processing will be available.

There is currently no way to fully parallelize Neon and MDP operations. Once an MDP operation is started, no Neon operations can be launched until all MDP operations are complete—even though memory usage analysis shows that certain Neon operations could be safely parallelized with MDP operations.

Neon is the only backend that comes close to using a third of the AXI bus bandwidth on existing platforms. Most backend operations can only use 20-25% of the memory bus bandwidth available, while performance is very low compared to competing platforms. If multiple backends could be used, overall bus and memory bandwidth utilization could increase, because peak performance is limited by hardware core peak performance—not overall bus bandwidth.

The prior Xorg driver is simply unable to resolve these short comings because it only provides a single queue of incoming requests and therefore appears incompatible with multiple backends. In addition, the synchronization Xorg provides through the EXA API 360 only allows the prior Xorg driver to wait for a particular operation to be synchronized with no parameters that could be extended to handle multiple backends or pipelines (Wait Marker( )/MarkSync( ). Furthermore, the prior Xorg driver is a single-threaded system which has resisted past attempts to add additional threads of execution.

In prior implementations, the prior Xorg driver does not have precise knowledge of when a request will be complete and the only way to determine previous request is complete is to send a request to the backend asking it to "synchronize" or complete all pending operations.

Various implementations of the virtual graphics processor 304 discussed further herein address one or more of these shortcomings in the prior, mixed approach.

In the embodiment depicted in FIGS. 3A and 3B, (just as in the embodiments discussed above with reference to FIGS. 1 and 2), memory utilization information for queued graphics-processing operations is obtained so that a determination may be made as to whether a memory utilization conflict will be created if two or more graphics-processing resources (e.g., the Neon resource 314, MDP resource 320, the first z180 core 322, and/or the second z180 core 324) operate simultaneously.

In the embodiment depicted in FIGS. 3A and 3B, Applicants have found that memory-utilization information may be obtained using callbacks provided by the EXA API 360 that were created for other purposes, but provide sufficient information to determine memory-utilization: PrepareAccess( ) and FinishAccess( ) callbacks. PrepareAccess was originally intended to be called just before referencing a graphical object on the screen or in non-display memory by a CPU operation (typically used for fallbacks). And FinishAccess( ) was originally intended to be called after such a fallback operation is finished.

Although these callbacks were originally intended for other purposes, enough information is passed into the virtual graphics processor 304 to specify the start and size of the memory region and its left, right, top and bottom boundaries. This information provides a means, for example, to determine when a particular operation carried out by the Neon resource 314 might intersect with the coordinates of another hardware operation already queued to another graphics-processing resource (e.g., the MDP resource 320 or one of the z180 resources 322, 324).

This information, in combination with the parameters provided in the requests that the EXA API 360 passes to the virtual graphics processor 304 is enough information to check if a particular operation effectuated by CPU fallback, the Neon resource 314, the MDP resource 320, the first z180 resource 322, or the second z180 resource 324 could interfere with any operation already sent to a different backend. In the embodiment depicted in FIGS. 3A and 3B, this memory-utilization information is stored in the processing list 306 and is managed by the synchronization component 308 in the virtual graphics processor 304 to enable the synchronization component 308 to determine what graphical-processing resource should (or may) be used when synchronization of a particular graphics-processing resource is necessary.

Though the procedure described here is not the originally intended usage of PrepareAccess( ) and FinishAccess( ) it is a legitimate, albeit unusual, usage that is likely to be supported by XServers indefinitely in the future because the parameters needed to map a memory range for CPU access for graphics use can also be used to check for conflicts that would prevent re-ordering of operations to maximize parallelism.

To parallelize an operation, the virtual graphics processor 304 need only determine whether a new operation conflicts with a queued operation, and if so, how long it would have to wait for that operation to complete. Many variations of the virtual graphics processor 304 also determine the optimal backend to use to minimize sync wait times.

As discussed above, a list of graphics operations (e.g., MDP operations, z180 operations, and/or Neon operations) that are sent to the graphics-processing resources is kept in the processing list 306 of the virtual graphics processor 304, and in this embodiment the list is kept in a time-sorted order and is cleared each time a sync occurs.

For exemplary purposes, many of the alternative modes of parallel processing are discussed herein in the context of parallel operations being executed by the MDP resource 320 and the Neon resource 314, but it should be recognized that the methodologies detailed herein are certainly applicable to other graphics-processing resources as well.

In many modes of operation, calculations are carried out that, at least, approximate when graphics-processing operations (e.g., MDP and Neon operations) will complete and how much CPU time they require. For example, prior empirical performance measurements (e.g., measurements of time to complete graphics-related operations) may be utilized to compute how many additional microseconds the MDP resource 320 or Neon resource 314 will require (at a minimum) to complete new requests, both in CPU time used and in total elapsed time.

As in the prior mixed mode, if the pixel area of an operation is less than around 10,000 pixels, it will usually take less CPU time to execute the operation with the Neon resource 314 than to send the request to the MDP resource 320, the first z180 resource 322, or the second z180 resource 324.

In this embodiment, the Linux GetTimeOfDay( ) call may be used to determine the starting time of when the MDP resource 320 begins blitting, and this time may be checked again when a choice needs to be made about whether the Neon resource 314 or another resource (e.g., the MDP resource 320) is more optimal to carry out a particular operation.

If an operation is determined to be best done on the Neon resource 314 (e.g., for pixel area or MDP-compatibility reasons) and the operation can be determined not to conflict with any operations on the pending list of operations for the MDP-resource 320, it will be executed immediately in the main thread; thus allowing both MDP and Neon operations to execute fully in parallel. But if it is otherwise not clear whether an operation should be executed on the Neon resource 314 or the MDP resource 320, the expected time of completion of a synchronization operation will be used to determine if the Neon resource 314 or the MDP resource 320 is best. And the following criteria may be considered:

If low electrical power usage is more critical than performance, the operation may be done on the MDP resource 320.

If the MDP resource 320 is expected to complete its operations relatively soon, then synchronization is carried out, and the MDP resource 320 completes its operation before the subsequent operation is completed immediately on the Neon resource 314.

"Relatively soon" may be defined by comparing the expected wait time to Neon total CPU time. If they are comparable (and the Neon operation is small enough), then it is generally better to execute the operation on the Neon resource 314.

If the MDP resource 320 is saturated (congested), then the Neon resource 314 is preferably utilized. With respect to the MDP resource 320, hardware saturation may be defined as follows:

"Saturated" qualitatively means that enough MDP requests have been sent to the MDP resource 320 that the MDP resource might as well not be there, so there is little point in trying to use it. If for example, the MDP resource 320 is going to require a number of milliseconds significantly in excess of around 10 ms, then the MDP resource 320 may be considered saturated (this length of time is chosen because it is slightly less than the smallest time the human brain can perceive—about 30 ms).

More specifically, in many implementations, the MDP resource 320 begins to be considered saturated at around 10 ms of pending requests—depending on the size of new requests. And it is considered fully saturated when the MDP resource 320 has about 30 ms or more of unfinished operations queued.

In many implementations, the MDP resource 320 is utilized as much as possible—up until the point it becomes fully saturated. And once the MDP resource 320 is saturated, it is generally better to use the Neon resource 314 instead. If the MDP resource 320 is allowed to become more and more saturated, there will be very undesirable side effects. For example, if a user holds down an arrow key to scroll to the bottom of a window's contents, and if the MDP resource 320 is saturated, the window might continue scrolling for tens of milliseconds after the user releases the key. The more saturated the MDP resource 320 is, the less reactive the system will appear to be.

By use of an exponential decay function, the threshold may be raised gradually at first and then more aggressively (as MDP congestion increases) to send increasing sizes of requests to the Neon resource 314 rather than the MDP resource 320 until the MDP resource 320 is no longer saturated. A plugin method may be used that generalizes the conditional nature of the syncs, and this plugin will allow the method to be usable on any graphics-processing resource that is eventually added to the mobile device 300.

The plugin may consider memory-utilization information of operations as follows:

Copy operations have a single source and destination region. Each region is rectangular, and has a certain pixel size (8, 16, 24, or 32 bits) and offset in memory, (X,Y) address, and base offset. This information makes it possible to compare rectangular areas to see if they overlap.

Fill operations operate only on destination rectangles, but otherwise can be checked for intersections like copy operations.

Composite (Porter Duff blending, transform and colorspace conversions) ops operate on one or two source rectangular regions and one destination region, but otherwise can be checked for intersections like copy or fill operations.

Fallback operations are only specified by a linear memory region (i.e. merely a start and end address—no rectangular coordinates). This can be compared to the source and destination regions of fill, copy or composite operations—though with less specificity than if full rectangular ranges were specified.

Two graphics-related operations are considered to intersect or conflict (and cannot be re-ordered) if the destination of a later operation intersects with the source or destination of a previous operation. It will also intersect if the source of a later operation intersects with the destination of an earlier operation. It is irrelevant whether the source of a later operation intersects with the source of an earlier operation.

Whenever two graphics-related operations intersect, they cannot be re-ordered with respect to each other. This, in turn, means that if an earlier operation is already pending on a hardware backend (e.g., the first z180 resource 322), a sync is required to schedule that operation on a different backend.

When operations are carried out in parallel on the MDP resource 320 and the Neon resource 314, there is a significant reduction of CPU wait time overhead. Sync overhead has been measured at between 15% and 30% under various circumstances. A reduction to 0% is unlikely for only two back-end engines, but a reduction from 30% to 15%-20% is possible, and peak performance could virtually double as well in some cases. That is because, with this change, MDP operations can now proceed fully in parallel with many Neon operations, so copy and fill peak performances can be summed.

The overhead of the additional code that is added to realize a particular embodiment of the synchronization component 308 has been measured at under 1% of the CPU 370. It takes only a few hundred cycles of ARM CPU code to potentially save syncs that take multiple milliseconds. But one of ordinary skill in the art will appreciate that implementations may vary.

Although not required, in some variations of the embodiment depicted in FIG. 3B, the synchronization component 308 is configured to query one or more drivers (e.g., the MDP kernel driver 346 and the z180 driver 348) associated with available graphics processing resources (e.g., the MDP resource 320, first z180 resource 322, and second z180 resource 324) to more precisely determine when operations will complete on the corresponding graphics-processing resource.

In the context of the MDP resource 320, an MDP ioctl call may be made to the kernel to find the next requested item that will complete. And optionally, an estimate of how complete the operation is may also be obtained. In addition, the MDP kernel driver 346 may be modified to add a user-space process ID, an MDP request counter, and a hash value for each request struct so that requests for a particular user-space process can be assured of matching the earliest request sent by a particular process that is not yet complete. As a consequence, rather than rely on estimates of completion time, the virtual graphics processor 304 may use this more accurate method of finding out when a sync will complete. This will make the previously discussed method for effectuating parallel operation (and other subsequent methods) more efficient.

In some variations, the drivers (e.g., the MDP kernel driver 346 and the z180 driver 348) of the available graphics processing resources (e.g., the MDP resource 320, first z180 resource 322 and second the second z180 resource 324) may also be queried to remove previously scheduled operations that are scheduled for a particular graphics-processing resource and re-schedule them to another graphics-processing resource.

With respect to operations scheduled to be carried out by the MDP resource 320 for example, an MDP ioctl call to the kernel may be added to remove a previously requested item that has no yet completed so the requested operation may be rescheduled. The MDP kernel driver 346 may be modified to add a user-space process ID, an MDP request counter, and a hash value for each requested struct so that requests for a particular user-space process can be assured of matching the earliest request sent by a particular process that is not yet complete. The process ID, request counter, and hash value must all match to remove an item from the MDP queue. The ioctl will return success upon removing an item and return failure otherwise.

Requested operations may be removed from a queue of a graphics-processing resource under the following conditions:
  When the graphics-processing resource (e.g., MDP resource 320) becomes saturated as discussed above; and/or
  When an operation can be much more efficiently executed on one resource (e.g., the MDP resource 320) then on another resource (e.g., the Neon resource 314), then it could be removed after being scheduled and executed on the other resource, and existing pixel area comparisons discussed above may be used to make this decision.

Although rescheduling operations may not improve peak performance over the parallel processing methodologies discussed above (that do not implement rescheduling), it is anticipated that better load balancing may be achieved—especially when more than two physical backends can be merged into a virtual backend. This will make it possible to get closer to peak theoretical performance.

Another technique that is not required, but may utilized to enhance, at least, apparent peak performance is to remove redundant graphics-related operations that are scheduled for one or more graphics-processing resources. For example, using techniques for querying graphics processing resources discussed above, and the techniques discussed above for modifying kernel level drivers to reschedule requests for operations, the list of scheduled operations (e.g., MDP operations) may be scanned (for all backends) and those operations that are redundant may be removed.

An operation may be considered redundant if a later operation that is opaque (e.g., no destination pixels in the region are unchanged) has a destination region that is a subset of the later operation. If the redundant operation has not actually started yet, it can safely be removed from the backend queue. A similar idea may be implemented at the same time: if two un-started operations enqueued for a set of backends have intersecting destinations and the later operation's destination is opaque, then the earlier operation could be modified to not overwrite the portion of the destination region in the intersection.

Reducing redundant operations has the effect of reducing the required bandwidth of a system by reducing the number of pixel-modifying operations in the memory subsystem; thus increasing performance and interactivity. This is especially beneficial when a system does not have the required memory graphics performance to complete the operations requested before operations with the same destinations are subsequently requested as part of a repetitive or cyclical process. An example of this type of repetitive process is scrolling. If an application requests scrolling more quickly than the graphics-processing resources can fulfill the requests, these methods will transparently drop operations periodically which are completely or partially overwritten by later operations.

This technique of scanning scheduled operations and removing redundant operations is effective in the context of congested or saturated graphics-processing resources because congested resources do not render scheduled operations immediately. But if a short delay were inserted before operations are sent to the graphics-processing resources, it would be possible to analyze scheduled operations even without congestion, and as a consequence, performance would be better in general (because opportunities for optimal scheduling and redundancy removal would increase) and interactivity would only suffer noticeably if the delay were more than around 30 ms.

This technique of scanning scheduled operations and removing redundant operations increases apparent peak performance (over the previously described techniques that do not remove redundant operations) by throwing out out-of-data graphics requests before they are rendered. This makes it possible to apparently exceed peak theoretical performance by catching up to the latest state of some destination pixmaps if a graphics-processing resource (e.g., MDP resource 320) is saturated.

In some variations of the embodiment depicted in FIG. 3B, it is contemplated that the virtual graphics processor 304 may be realized by a multi-threaded driver (e.g., a Qualcomm xf86-video-msm driver adapted so as to be capable of multi-threaded operation). An advantage to these embodiments is that one or more ARM CPUs on separate threads could be used to queue up Neon operations for execution. This would have the desirable benefit of further increasing parallelism and adding even more queues that can be used to reduce intersection conflicts.

As discussed above, several embodiments of the present invention may support several potential graphics-processing resources. It is contemplated for example, that peak performance could double (or more) over previous methods when three graphics-core type graphics processing resources (e.g., the first z180 resource 322, the second z180 resource 324, and the MDP resource 320) instead of just one graphics-processing resource, and up to four Neon resources 314 (rather than one) are usable in parallel. Also, since there are more graphics-processing resources, sync overhead is anticipated to be reduced because syncs will be less necessary.

But the addition of multi-threading to embodiments that operate several graphics-processing resources in parallel increases the likelihood that peak performance will be met in some cases. In addition, some variations may be adapted to create multiple queues that are more efficiently managed than in any non-multi-threaded method.

In yet other embodiments, 3D graphics cores (e.g., the z460 resource 326) are conceptually unified in one or more variations of the virtual graphics processor 304 with the 2D graphics-processing resources. The benefits and characteristics of such a system include:

- The 3D graphics operation stream has some purely 2D texture-only operations. Those could be scheduled on the 2D cores instead of the 3D core. This could reduce 3D core congestion when the 2D cores are not busy.
- All 2D graphics operations can be transformed to equivalent 3D operations by specifying those operations on a flat surface relative to the camera view. This could reduce 2D core congestion when the 3D core is not busy.
- There is potential for best-case doubling of efficiency and performance of 2D or 3D systems (e.g., best-case is when 2D and 3D operations do not overlap and 2D performance on combined z1xx/MDP/Neon cores is equivalent to 2D performance emulated on z4xx).

Area-Partitioning Operation Transforms Across Multiple z180 and Neon 2D Backends.

Use of area-partitioning transforms is compatible with the other embodiments previous discussed herein. In operation, the areas of some operations are re-partitioned, transforming a single graphical operation into multiple operations, each of which can execute independently on a different graphical-processing resource. This helps performance most when the canonical graphical operation stream cannot be efficiently load-balanced across multiple cores because of dependencies between source and destination locations.

General Partitioning Methods

The central recognition of this method is that many times a stream of graphics operations cannot easily be load-balanced between multiple cores. In these cases, there are often ways to transform the operations so that a near-optimal load-balancing of operations across cores is possible. The easiest way to transform a stream of operations that do not use all cores efficiently is to transform some of the operations in the input stream into multiple operations that can run across cores: the easiest way to do this is with area-partitioning. Area-partitioning includes dividing up a graphical operation in the form of a mathematical operation with a source area, destination area (and sometimes a mask area) into two or more nearly equally-sized operations with smaller destination areas (and often smaller mask and source areas).

In the cases of simple operations like fixed-size, scaled or rotated BLITs (or area copies), reducing the area of the destination also reduces the required area of the source by the same ratio, meaning there is no inherent efficiency loss when transforming single operations into multiple operations. If the graphical operation has complex, many-source-pixel-to-one-destination-pixel relationship (like bilinear-filtering for scaled copies, for example), the size of the source area may not be reduced in the two or more resulting operations, resulting in some increase in processing cost—though it may be a minor increase.

In some implementations, the way the area is partitioned is arbitrary, but the choice of partitioning algorithm is important in other cases. For example, if a BLIT has a source area that is totally disjoint to the destination area, the source area and destination area can be split into multiple parts in any arbitrary way and the two operations will be equivalent to the original larger operation. On the other hand, if a BLIT (or area copy) has overlapping source and destination areas (which is common in the case of an on-screen window scrolling up or down or sideways), it is important to choose how to partition the areas carefully. If the scrolling direction is vertical, the resulting source and destination area partitions cannot normally share any X coordinates. The simplest partitioning scheme is to divide the areas into left and right portions separated by a single vertical line. Likewise, if the scrolling direction is horizontal, the resulting source and destination area partitions cannot normally share any Y coordinates.

Synchronization

Just as in previous methods, multiple cores are synchronized, but it should be noted that re-partitioning an operation may allow for opportunities to reduce dependencies. If two sequential operations overlap, for example, only in a portion of the destination area, then normally the core that the first operation runs on must wait before allowing the second operation to run. But it is often possible to re-partition the source, destination, and mask areas so that these dependencies are removed in the resulting partitioned operations.

Interleaving: a Special Case of Partitioning

Interleaving is a special case of partitioning where the area being divided is split into multiple disjoint sets of areas—most commonly each set includes odd-scanline rows or even scanline rows. This method is historically important because it was, and still is, easy to implement in hardware, but it a somewhat inflexible method.

Generally, interleaving two graphics cores only speeds up certain classes of operations, and the types of operations that benefit from interleaving depend on the technical details of how the interleaving is implemented.

In the case of two graphics cores (e.g., two z180 resources 322, 324 in the 8660 and 8672 systems), assuming even display memory rows addressable by one z180 core, odd rows addressable by the second z180 resource 324 and all non-display memory addressed in a non-interleaved way by each z180 resource 322, 324 (though this is not the only way to do an interleaving implementation):

- Solid fills of a single pixel to a rectangle can take full advantage of interleaving. Unfortunately, solid fills are probably less than 10% of a typical total workload.
- Scrolling will only benefit when scroll offsets are a multiple of two (because an odd height requires that odd rows be copied to even rows or vice versa). So, if a window has an odd height, interleaving can not be used at all and scrolling will only be possible at all if the z180 resource 322, 324 provides a way to access screen memory in a non-interleaved manner.

In general, copies or other transforms from a non-interleaved memory area to an interleaved memory area will fully benefit from interleaving with the second z180 resource 324. But some source to destination transforms (for example, bilinear filtering, which is used for scaling video) will cause memory read bandwidth required to be up to twice as high for the same performance as with a non-interleaved mode on a single z180. Therefore, overall performance with two z180 resources (e.g., the first z180 resource 322 and the second z180 resource 324) may be lower than using a single z180 resource for these operations as a result.

Furthermore, the X11 API does not have a mechanism for synchronizing the two z180 resources 322, 324. Each z180 resource 322, 324 will take slightly different amounts of time to complete operations even if the operations have exactly the same number of pixels on each core (and in many cases the number of pixels will differ, which makes the problem worse). Therefore, each z180 resource 322, 324 is synced after each interleaved operation to insure no screen corruption, which will reduce overall performance further and complicate the X server.

As a consequence, interleaving should probably not be the only area-partitioning method used to assist load balancing. If it is the only method, performance is likely to suffer. There is potential for best-case N times performance increases for N cores, but in practice, this method needs to be used with other methods to come close to achieving that type of increase.

In conclusion, embodiments of the present invention provide, among other things, parallel processing of graphics-related operations over two or more graphics-processing resources. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for managing graphics processing of a computing device including:
   receiving a plurality of requests for graphics-related operations, the plurality of requests including a prior request for a first graphics-related operation and a subsequent request for a second graphics-related operation;
   creating a time-ordered list of the plurality of requests for graphics-related operations, the time-ordered list including the prior request and the subsequent request;
   initiating execution of the first graphics-related operation with a first graphics-processing resource;
   receiving potential-memory-utilization-information that provides an indication of potential memory usage by a second graphics-processing resource if the second graphics-related operation were executed by the second graphics-processing resource; and
   executing, at least in part, the second graphics-related operation with the second graphics-processing resource simultaneously with the execution of first graphics-related operation by the first graphics-processing resource if the potential-memory-utilization-information indicates that the second graphics-related operation may be executed by the second graphics-processing resource without conflicting with the execution of the first graphics-related operation; and
   determining whether execution of the second graphics-related operation by the second graphics-processing resource, simultaneously with the execution of the first graphics-related operation by the first graphics-processing resource, effectuates an execution of the second graphics-related operation at a faster rate than if the second graphics-related operation were executed by the first graphics-processing resource after the first graphics-processing resource executed the first graphics-related operation.

2. The method of claim 1, wherein the determining includes determining whether the first graphics-processing resource is saturated with a backlog of requests for operations that require more than a threshold amount of time to complete.

3. The method of claim 1, including executing, if power usage is more critical than performance, the second graphics-related operation with one of the first or second graphics-processing resource that utilizes a least amount of power regardless of whether the second graphics-related operation may be executed by the second graphics-processing resource without conflicting with the execution of the first graphics-related operation.

4. The method of claim 1, wherein the potential-memory-utilization-information indicates that the second graphics-related operation may be executed by the second graphics-processing resource without conflicting with the execution of the first graphics-related operation when a memory destination of the second graphics-related operation neither intersects with a memory source of the first graphics-related operation nor a memory destination of the second graphics-related operation.

5. The method of claim 1, including:
   querying a driver for the first graphics-processing resource so as to determine when execution of the first graphics-related operation will complete.

6. The method of claim 5, including:
   accessing the driver for the first graphics-processing resource and removing at least one yet-to-be-completed graphics-related operation that is scheduled for the first graphics-processing resource; and
   rescheduling the at least one graphics-related operation for execution by another graphics-processing resource.

7. The method of claim 5, including:
   scanning a schedule of requested operations in the driver for the first graphics-processing resource that has not yet been completed; and
   removing requested operations in the schedule that are redundant to earlier scheduled operations.

8. The method of claim 1, including:
   executing, simultaneously with execution of the first graphics-related operation and the second graphics-related operation, one or more other graphics-related operations with corresponding one or more other graphics-processing resources.

9. The method of claim 1, including:
   receiving the plurality of requests via an API selected from the group consisting of Skia, C2D, OpenVG, and Xorg.

10. The method of claim 1, including executing two or more graphics-related operations with two or more threads simultaneously with the execution of the first graphics-related operation.

11. The method of claim 1, including:
    executing at least a portion of a 3D-graphics-related operation utilizing a 2D-graphics-processing resource; and
    executing at least a portion of a 2D-graphics-related operation utilizing a 3D-graphics-processing resource.

12. The method of claim 1, including transforming a single request for a graphics-related operation into two or more operations; and
    executing the two or more operations on two or more separate and corresponding graphics-processing resources.

13. A mobile computing apparatus including:
    physical memory;
    at least two distinct graphics-processing devices;
    a bus coupled to the physical memory and the at least two distinct graphics-processing devices;
    a virtual graphics processing component that is adapted to enable each of a first and a second graphics-processing operations to be executed, in parallel, by a corresponding one of the at least two distinct graphics-processing devices, each of the at least two distinct graphics-processing devices operating in the same memory surface at the same time, wherein the virtual graphics processing component is adapted to determine whether execution of the second graphics-processing operation by the second graphics-processing resource, simultaneously with the execution of the first graphics-processing operation by the first graphics-processing resource, effectuates an execution of the second graphics-processing operation at a faster rate than if the second graphics-processing operation were executed by the first graphics-processing resource after the first graphics-processing resource executed the first graphics-processing operation.

14. The mobile computing apparatus of claim 13, wherein the virtual graphics processing component is configured to store a list of graphics-processing operations and determine whether a subsequent graphics processing operation would create a conflict with a prior graphics-processing operation before executing the subsequent graphics processing operation in parallel with the prior graphics-processing operation.

15. The mobile computing apparatus of claim 13, wherein the graphics-processing devices are graphics-processing devices selected from the group consisting of MDP, z180, and CPU devices.

16. A computing apparatus, comprising:
physical memory;
at least two graphics-processing resources;
a bus coupled to the physical memory and the at least two graphics-processing resources;
means for receiving a plurality of requests for graphics-related operations, the plurality of requests including a prior request for a first graphics-related operation and a subsequent request for a second graphics-related operation;
means for creating a time-ordered list of the plurality of requests for graphics-related operations, the time-ordered list including the prior request and the subsequent request;
means for initiating execution of the first graphics-related operation with a first graphics-processing resource;
means for receiving potential-memory-utilization-information that provides an indication of potential memory usage by a second graphics-processing resource if the second graphics-related operation were executed by the second graphics-processing resource; and
means for executing, at least in part, the second graphics-related operation with the second graphics-processing resource simultaneously with the execution of first graphics-related operation by the first graphics-processing resource if the potential-memory-utilization-information indicates that the second graphics-related operation may be executed by the second graphics-processing resource without conflicting with the execution of the first graphics-related operation; and
means for determining whether execution of the second graphics-related operation by the second graphics-processing resource, simultaneously with the execution of the first graphics-related operation by the first graphics-processing resource, effectuates an execution of the second graphics-related operation at a faster rate than if the second graphics-related operation were executed by the first graphics-processing resource after the first graphics-processing resource executed the first graphics-related operation.

17. The computing apparatus of claim 16, wherein the means for determining includes means for determining whether the first graphics-processing resource is saturated with a backlog of requests for operations that require more than a threshold amount of time to complete.

18. The computing apparatus of claim 17, including means for executing, if power usage is more critical than performance, the second graphics-related operation with one of the first or second graphics-processing resource that utilizes a least amount of power regardless of whether the second graphics-related operation may be executed by the second graphics-processing resource without conflicting with the execution of the first graphics-related operation.

19. The computing apparatus of claim 16, wherein the potential-memory-utilization-information indicates that the second graphics-related operation may be executed by the second graphics-processing resource without conflicting with the execution of the first graphics-related operation when a memory destination of the second graphics-related operation neither intersects with a memory source of the first graphics-related operation nor a memory destination of the second graphics-related operation.

20. The computing apparatus of claim 16, including:
means for querying a driver for the first graphics-processing resource so as to determine when execution of the prior request will complete.

21. The computing apparatus of claim 20, including:
means for accessing the driver for the first graphics-processing resource and means for removing at least one yet-to-be-completed graphics-related operation that is scheduled for the first graphics-processing resource; and
means for rescheduling the at least one graphics-related operation for execution by another graphics-processing resource.

22. The computing apparatus of claim 20, including:
means for scanning a schedule of requested operations in the driver for the first graphics-processing resource that have not yet been completed; and
means for removing requested operations in the schedule that are redundant to earlier scheduled operations.

23. The computing apparatus of claim 16, including:
means for executing, simultaneously with execution of the first graphics-related operation and the second graphics-related operation, one or more other graphics-related operations with corresponding one or more other graphics-processing resources.

24. The computing apparatus of claim 16, including:
means for receiving the plurality of requests via an API selected from the group consisting of Skia, C2D, OpenVG, and Xorg.

25. The computing apparatus of claim 16, including means for executing two or more graphics-related operations with two or more threads simultaneously with the execution of the first graphics-related operation.

26. The computing apparatus of claim 16, including:
means for executing at least a portion of a 3D-graphics-related operation utilizing a 2D-graphics-processing resource; and
means for executing at least a portion of a 2D-graphics-related operation utilizing a 3D-graphics-processing resource.

27. The computing apparatus of claim 16, including:
means for transforming a single request for a graphics-related operation into two or more operations; and
means for executing the two or more operations on two or more separate and corresponding graphics-processing resources.

28. A non-transitory, tangible computer readable storage medium, encoded with processor readable instructions to perform a method for managing memory of a computing device, the method comprising:
receiving a plurality of requests for graphics-related operations, the plurality of requests including a prior request for a first graphics-related operation and a subsequent request for a second graphics-related operation;

creating a time-ordered list of the plurality of requests for graphics-related operations, the time-ordered list including the prior request and the subsequent request;

initiating execution of the first graphics-related operation with a first graphics-processing resource;

receiving potential-memory-utilization-information that provides an indication of potential memory usage by a second graphics-processing resource if the second graphics-related operation were executed by the second graphics-processing resource; and executing, at least in part, the second graphics-related operation with the second graphics-processing resource simultaneously with the execution of first graphics-related operation by the first graphics-processing resource if the potential-memory-utilization-information indicates that the second graphics-related operation may be executed by the second graphics-processing resource without conflicting with the execution of the first graphics-related operation; and determining whether execution of the second graphics-related operation by the second graphics-processing resource, simultaneously with the execution of the first graphics-related operation by the first graphics-processing resource, effectuates an execution of the second graphics-related operation at a faster rate than if the second graphics-related operation were executed by the first graphics-processing resource after the first graphics-processing resource executed the first graphics-related operation.

29. The non-transitory, tangible computer readable storage medium of claim 28, wherein the determining includes determining whether the first graphics-processing resource is saturated with a backlog of requests for operations that require more than a threshold amount of time to complete.

30. The non-transitory, tangible computer readable storage medium of claim 28, the method including executing, if power usage is more critical than performance, the second graphics-related operation with one of the first or second graphics-processing resource that utilizes a least amount of power regardless of whether the second graphics-related operation may be executed by the second graphics-processing resource without conflicting with the execution of the first graphics-related operation.

31. The non-transitory, tangible computer readable storage medium of claim 28, wherein the potential-memory-utilization-information indicates that the second graphics-related operation may be executed by the second graphics-processing resource without conflicting with the execution of the first graphics-related operation when a memory destination of the second graphics-related operation neither intersects with a memory source of the first graphics-related operation nor a memory destination of the second graphics-related operation.

32. The non-transitory, tangible computer readable storage medium of claim 28, the method including:
querying a driver for the first graphics-processing resource so as to determine when execution of the first request will complete.

33. The non-transitory, tangible computer readable storage medium of claim 32, the method including:
accessing the driver for the first graphics-processing resource and removing at least one yet-to-be-completed graphics-related operation that is scheduled for the first graphics-processing resource; and
rescheduling the at least one graphics-related operation for execution by another graphics-processing resource.

34. The non-transitory, tangible computer readable storage medium of claim 32, the method including:
scanning a schedule of requested operations in the driver for the first graphics-processing resource that have not yet been completed; and
removing requested operations in the schedule that are redundant to earlier scheduled operations.

35. The non-transitory, tangible computer readable storage medium of claim 28, the method including:
executing, simultaneously with execution of the first graphics-related operation and the second graphics-related operation, one or more other graphics-related operations with corresponding one or more other graphics-processing resources.

36. The non-transitory, tangible computer readable storage medium of claim 28, the method including:
receiving the plurality of requests via an API selected from the group consisting of Skia, C2D, OpenVG, and Xorg.

37. The non-transitory, tangible computer readable storage medium of claim 28, the method including:
executing two or more graphics-related operations with two or more threads simultaneously with the execution of the first graphics-related operation.

38. The non-transitory, tangible computer readable storage medium of claim 28, the method including:
executing at least a portion of a 3D-graphics-related operation utilizing a 2D-graphics-processing resource; and
executing at least a portion of a 2D-graphics-related operation utilizing a 3D-graphics-processing resource.

39. The non-transitory, tangible computer readable storage medium of claim 28, the method including transforming a single request for a graphics-related operation into two or more operations; and
executing the two or more operations on two or more separate and corresponding graphics-processing resources.

* * * * *